Patented Jan. 27, 1953

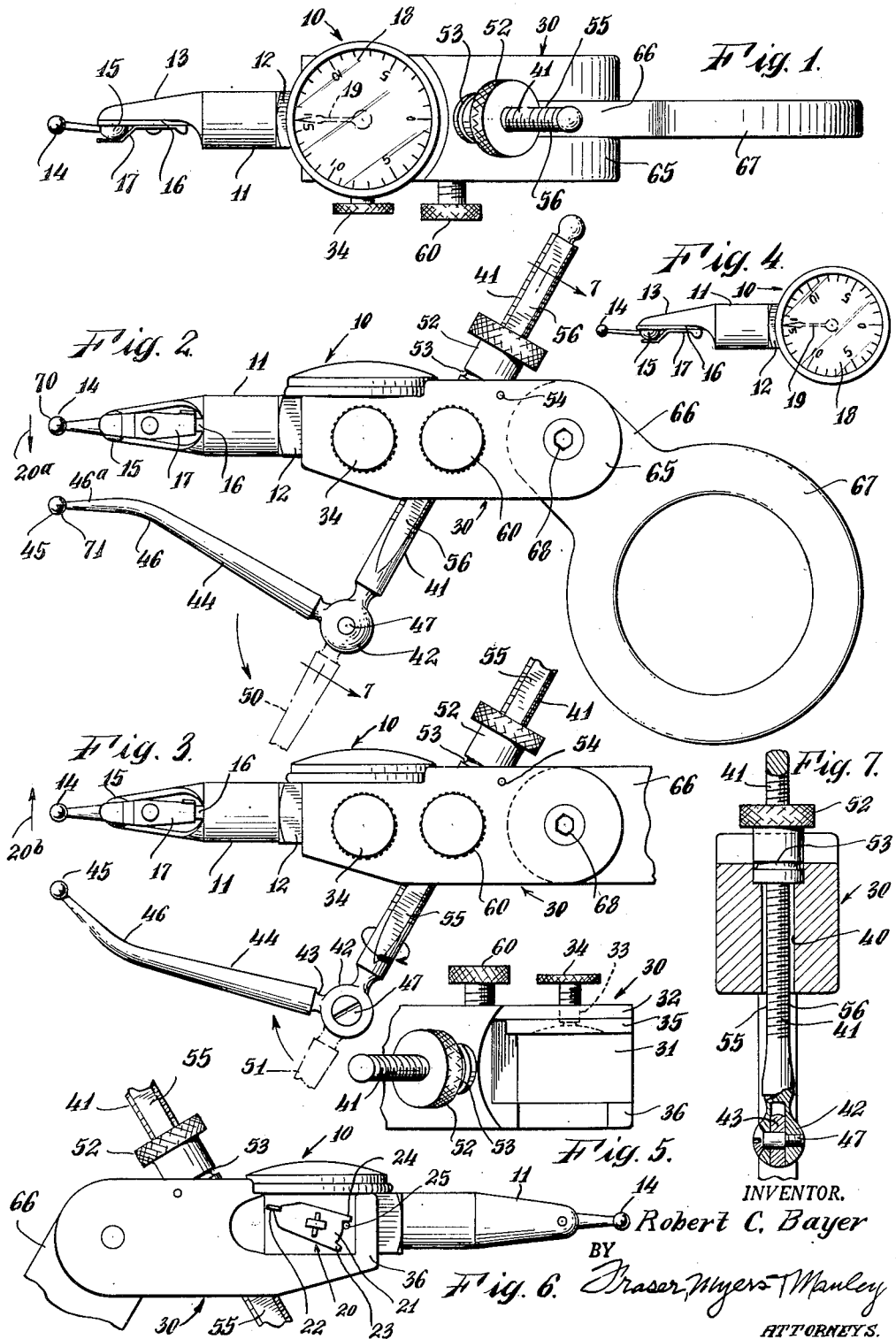

2,626,462

UNITED STATES PATENT OFFICE 2,626,462

UNIVERSAL INDICATOR GAUGE

Robert C. Bayer, Jamaica Estates, N. Y.

Application October 29, 1947, Serial No. 782,793

7 Claims. (Cl. 33—147)

The present invention relates to an improved universal indicator gage preferably of the comparative type, which can be used in place of inside and outside calipers, ball gages, telescope gages, inside micrometers, snap gages, plug gages and the like.

In precision manufacture when tolerances are frequently as small as one ten-thousandth of an inch, it is common practice to provide special gages and blocks to check dimensions of slots and key-ways; inside and outside calipers for gaging inside and outside dimensions respectively, as well as ball gages, telescope gages, snap and plug gages and the like for gaging various forms of close tolerance machine work. A complete set of gages such as enumerated in the preceding sentence entails a substantial investment, and still it is not possible with such gages accurately to measure the work in process under all conditions.

An object of the present invention is to provide a universal gage of simple construction, which will be cheap to manufacture, and which may be used in place of the hereinbefore mentioned special forms of gages, inside and outside calipers, and inside micrometers.

A further object of the invention is to provide a holder of novel construction which is especially adapted to accommodate a commercially available form of test indicator known as the "Starrett Last Word" indicator, and in combination with said indicator will provide a universal gage of the aforesaid character.

A further object of the invention is to provide a holder for an indicator of the "Starrett Last Word" type or its equivalent, which when combined with such indicator will be accurate to one ten-thousandth of an inch, and which may be used for measuring wide ranges such for instance as inside and outside dimensions of from .250 to 6 or more inches.

Still further objects of the invention are to provide such a universal gage which may be quickly and accurately converted from an inside gage to an outside gage; which is adapted for quick adjustment for handling relatively small or relatively large work dimensions; and which is so constructed and arranged that only one hand of the user is required for holding the gage and simultaneously adjusting it in order to obtain the final reading.

The foregoing and other objects not specifically enumerated are accomplished by the present invention which provides a holder of novel construction adapted to receive and accommodate against displacement a standard form of indicator having a resiliently mounted ball foot which may be selectively displaced laterally in one of two directions in a common plane and including means such as a dial and pointer for indicating such lateral displacement in suitable units such as .0001"; said holder including a second ball foot suitably mounted for cooperation with the first mentioned foot, said ball feet serving as the work engaging portions of the gage; said second mentioned foot being adapted for manual movement in a common plane with the first ball foot for quick adjustment to approximate size of the part to be gaged and being provided with a separate adjustment means for final accurate positioning of the two feet relatively to each other; means also being provided for reversing the position of the second foot in the holder whereby the gage may be selectively used either as an inside or an outside micrometer caliper; the holder also being so constructed and arranged that the user has ready access to a snap reversing trigger customarily found on the "Starrett Last Word" type indicator to adapt the ball foot thereof to the measurement of either inside or outside dimensions.

For a more complete understanding of the present invention reference is now made to the accompanying drawings wherein:

Figure 1 is a top plan view showing an indicator mounted in a holder of the present invention—the holder and indicator in combination constituting the universal gage of the present invention;

Fig. 2 is a side elevational view of the gage and holder of Fig. 1;

Fig. 3 is a fragmentary side elevational view similar to Fig. 2 but showing the foot on the holder in reversed position for use as an outside caliper;

Fig. 4 is a top plan view of the indicator as shown in Fig. 1, without the holder provided by the present invention;

Fig. 5 is a fragmentary top plan view of the holder;

Fig. 6 is a fragmentary side elevational view of the side of the gage and holder opposite to that shown in Fig. 2; and Fig. 7 is a sectional view taken along the line 7—7 in Fig. 2, looking in the direction of the arrows.

Referring to the drawings, a well known type of indicator 10 which is commercially available as the "Starrett Last Word" indicator is shown in elevation in Fig. 4. This indicator is illustrated and described in United States Letters Patent Nos. 1,144,367, 1,466,664 and 1,585,778. The indicator essentially comprises a body 11 which is of substantially rectangular cross section at one end 12 and is of reduced cross section at its opposite end 13. A ball foot 14 provided on a short leg is suitably connected at 15 to a lever 16 fulcrumed at 15, the ball foot being maintained in position relative to said lever by a leaf spring 17. A dial 18 is frictionally mounted at the rectangular end 12, said dial being movable manually relatively to a pointer 19 and to the body 11 to bring any desired indicia on the dial into registry with the pointer. As described in the aforesaid Letters Patent, when the foot 14 is displaced laterally rearwardly or forwardly as viewed in Fig. 4, or upwardly or downwardly as viewed in Fig. 2, the lever 16 is pivoted about its fulcrum 15 and through internal mechanism (not shown) causes the pointer 19 to move across the face of the dial 18.

As best seen in Fig. 6 the "Starrett Last Word" indicator is provided with a trigger 20 comprising a pivoted plate 21 having at one end an upstanding finger engaging part 22 and at its opposite end two spaced lips 23, 24 which latter are adapted to selectively engage a pin 25—said trigger being manually shiftable from the position shown in Fig. 6 where the lip 24 engages the pin 25, to a position where the lip 23 would engage the pin 25. As described in the aforesaid Patent No. 1,466,664, the foot 14 is resiliently mounted to yield in one direction when the trigger is in one position, and to yield in the opposite direction when the trigger is in the second position. The "Starrett Last Word" indicator as thus described is now a well known commercial product which is found in practically every machine shop and manufacturing plant which does precision machine work.

A feature of the present invention is the adaptation of a holder or support for an indicator as described or its equivalent, in providing a universal gage.

The holder of the present invention comprises a body 30 having a substantially rectangular socket 31 of a size and shape to accommodate the rectangular end 12 of the indicator 10. One lateral wall 32 of the holder flanking the socket 31 is provided with a screw-threaded hole 33 therein into which is threaded a thumb screw 34 having swivelly mounted on its inner end a clamping plate 35 for securely locking the end 12 of the indicator within said socket 31 against the opposite lateral wall 36 of said holder. The wall 36 is suitably cut away as shown in Figs. 5 and 6 to expose the trigger 20 for manual movement as desired.

The body 30 is formed with an inclined transverse untapped hole 40 which is of a size and shape to accommodate an adjusting screw 41 mounted therein, said adjusting screw being bifurcated at its end 42 to receive one end 43 of a leg member 44 which is provided at its opposite end with a ball foot 45—said ball foot 45 constituting an auxiliary foot for cooperation with the foot 14 of the indicator 10, which ball feet together constitute the work engaging portions of the gage of the present invention. The leg 44 preferably is given a wide-angled bend 46 so as to provide one end portion 46a adjacent the ball foot 45 which may be brought into close relation to the ball foot 14 and thereby permit the insertion of both ball feet into a relatively narrow hole, deep slot, key-way, or the like. The leg 44 is suitably mounted in the bifurcated end of the adjusting screw 41 for pivotal action in a plane, and is frictionally held in selected positions by screw 47. The leg 44 is manually movable in the direction of the arrow as shown in Fig. 2 to any one selected position, such for instance as the position indicated by dot and dash lines at 50, or from the dot and dash position 51 shown in Fig. 3 to its actual position therein shown.

The upper end of the inclined transverse hole 40 in the body 30 is of slightly enlarged diameter to accommodate the lower end of a thumb nut 52 which has adjacent said lower end an annular groove 53 in its surface into which groove extends a pin 54, whereby the nut 52 is maintained in assembled relation to the body 30. The adjusting screw 41 is threaded within the nut 52 and hence is movable relatively to said body 30 upon manual rotation of said nut.

As will be observed in the drawings, the adjusting screw 41 is formed with two flat parallel surfaces 55, 56, which are also parallel to the plane of movement of the leg 44 about its pivot at the bifurcated end 42. In the lateral wall 32 of the body 30 and at right angles to the hole 40 and communicating therewith is a tapped hole in which a thumb set screw 60 is threaded, said set screw having an inner end face adapted to engage one or the other of flat parallel surfaces 55 and 56 on the adjusting screw 41 to maintain said surfaces truly parallel to the plane defined by a median plane passing through said leg 44 and the ball foot 14, so that the centers of said ball feet 14 and 45 will always be in said median plane.

The end of the body 30 opposite to that formed with the socket 31 is bifurcated at 65 to receive a tongue 66 formed on a ring handle 67 which is secured to said body by retaining screw 68. The handle 67 is normally held in fixed position by the friction exerted on the tongue 66, but may be moved manually to selected positions by the application of sufficient force to overcome such friction.

When the gage of the present invention is arranged as shown in Fig. 2 of the drawings with the wide-angled bend 46 in leg 44 directed inwardly, the gage is especially adapted for use as an inside caliper or for gaging the dimensions of key-ways and the like. When so used, the trigger 20 should be snapped to the position which makes the foot 14 deflectable against spring pressure in the direction of the arrow 20a shown in Fig. 2. It will then be impossible to move the ball foot in the opposite direction beyond its midposition as shown. With the aid of an outside micrometer the ball feet 14 and 45 are then adjusted relatively to each other until the points 70, 71 at opposite ends of their common diameter are spaced from each other the exact dimension required, to one ten-thousandth of an inch, and with the ball foot 14 deflected slightly in the direction of the arrow in Fig. 2 so as to cause the pointer 19 on dial 18 to align with a reference mark such for instance as "10." This is done by manually moving the leg 44 to an approximate position, and making the final exact adjustment by rotating thumb nut 52. To facilitate such final adjustment the holder or support and ring handle are held in the palm of the hand of a user with the dial 18 and the adjusting thumb nut 52 facing upwardly, and then rotating the nut 52 with the thumb and index finger of the hand holding the instrument, thus providing a one hand final adjustment of the device. With the feet 14 and 45 thus positioned they are inserted within a key-way or the like for gaging its internal dimension. If the dimension of the key-way is exactly right the pointer will again coincide with the reference numeral "10" on the dial. If the key-way is undersized as much as .005", the pointer will be deflected 5 additional graduations to the numeral "5"; if the key-way is oversized by .001", the pointer will move to the graduation corresponding to "11."

In arriving at the original relative positions of the two feet 14 and 45 for gaging the internal dimension of a key-way for instance of say .5687", the leg 44 is first moved manually about its friction joint 42 to the approximate dimension required and then the final accurate adjustment of the relative positions of the two feet is accomplished by turning the thumb nut 52 to move the adjusting screw 41 inwardly or outwardly in the body 30 until the ball feet 14 and 45 are exactly positioned at the required distance as indicated by an outside micrometer when the pointer 19 is displaced on the dial 18 and gives a reading such as "10" as above. If the gage is next used for a dimension of say 3.1562", the leg 44 is manually moved about its pivot 42 until the feet 14 and 45 are approximately 3" apart. The final exact adjustment is made once again by means of the thumb nut 52 on the adjusting screw 41.

When the gage is used for measuring the dimensions of holes, key-ways and the like, the ball feet 14 and 45 are inserted within the hole and their relative position adjusted by turning thumb nut 52 until the pointer 19 on dial 18 is again deflected to a selected reference numeral, such as "10." The exact dimension can then be read from an outside micrometer which is itself adjusted until the pointer 19 again coincides with the selected reference "10" on the dial.

When it is desired to use the gage of the present invention for gaging outside dimensions, such for instance as an outside caliper, the position of the leg 44 should be reversed from that shown in Fig. 2 to that shown in Fig. 3 with the wide-angled bend disposed outwardly. This is accomplished merely by loosening the thumb set screw 60 to disengage it from the flat face 56 on the adjusting screw and revolving said adjusting screw 41 in hole 40 in body 30 through 180° so as to bring the opposite face 55 on said adjusting screw into position for engagement by the set screw 60 which is then tightened to engage said face firmly and to retain the leg 44 again in the required plane. The leg 44 is then pivoted about the joint 42 as indicated by the arrow in Fig. 3, to assume the position there shown. It will be understood of course that the flat face provided on the inner end of set screw 60 which engages the flat surfaces 55, 56 on the opposite sides of the adjusting screw 41 is such as to permit relative movement between such adjusting screw and set screw when the thumb nut 52 is turned. In order to indicate outside dimensions the ball foot 14 should be made pressure responsive in the opposite direction, as indicated by the arrow 29b in Fig. 3. This is accomplished merely by moving the trigger 20 to the position opposite that shown in Fig. 5 with the lip 24 in engagement with the pin 25.

The outside dimension of the work is first obtained by adjusting the ball feet 14 and 45 relatively to each other, as before described, until the pointer 19 once again coincides with a selected reference mark such as "10" on dial 18. The exact outside dimension of the work can then be obtained by using size blocks or the like which are selectively inserted between feet 14 and 45 of the gage until the pointer 19 coincides with the same reference numeral "10" on the dial 18.

While the invention has been described as a holder for a standard form of indicator to provide in combination a universal gage, it will be understood of course that it is within the scope of the present invention to provide a unitary construction wherein the pressure responsive foot 14, the dial 18, pointer 19 and their actuating mechanisms do not constitute a separable assembly.

It will be understood that the gage as herein illustrated is adapted to check inside diameters and recesses from .250" to 6.000" or more, as close as one ten-thousandth of an inch. Outside dimensions, as well as wall thicknesses of as little as .0001" can be checked accurately. It is within the scope of the present invention further to enlarge the range of the instrument merely by providing a mechanical link between the end 42 of the adjusting screw and the upper end 43 on the leg 44, or in any other suitable manner as long as said link maintains the leg 40 at all times in the required plane.

It will also be noted that the ball feet 14 and 45 are perfect spheres except for the portion which is connected to the respective legs, which assures uniformity of dimension at all times along their common diameters. The ball feet also are preferably lapped and hardened to prevent wear.

While I have shown and described the preferred form of the invention, it will be understood that modifications may be made therein without departing from the spirit of the invention or from the scope of the appended claims.

What I claim is:

1. A gage comprising a support or holder, a unitary test indicator mounted on said support and having a surface-contacting part, said support having an opening therethrough extending transversely to the surface-contacting part of the test indicator, a screw-threaded member slidably adjustable in said opening, a foot portion pivotally mounted on the screw-threaded member and having a surface-contacting part for cooperation with the surface-contacting part on the test indicator, said foot portion being manually movable in a plane common with the surface-contacting part on the test indicator and providing means for making a quick approximate setting of the gage, and a nut rotatably mounted on the support and engaging the screw-threaded member for moving said member axially of its length for making a fine adjustment of the surface-contacting part on the pivotally mounted foot portion.

2. A gage according to claim 1 wherein the transverse opening in the support is of a size to permit rotation of the screw-threaded member therein, said screw-threaded member having opposite flat parallel faces which are adapted to be held in either of two predetermined positions in relation to the holder, and clamping means for engaging one of said flat faces to prevent rotation of the screw-threaded member and insure movement thereof in a plane as set forth.

3. A gage according to claim 1 wherein the test indicator and the rotatable adjusting nut are disposed on the same side of the support, and the support is of a form to be held in the palm of the hand of a user and when so held with the test indicator and adjusting nut facing upwardly, the nut can be rotated by the thumb and index finger thereby providing a one hand final adjustment of the gage.

4. A holder, for use with a removable unitary test indicator of the type having a body portion, a deflectable surface-contacting part and indicating means responsive to deflection of the surface-contacting part for providing with the holder a gage of the character set forth, said holder having a socket therein adapted to receive and hold the body portion of such unitary test indicator, said holder having a transverse opening therethrough, a member extending through and slidably adjustable in said opening, manually operable means cooperating with both the holder and the member for slidably moving said member in a plane, and a foot portion on said member manually adjustable in the plane of movement of said member and with respect thereto and having a surface contacting part for cooperation with the surface contacting part on a test indicator when mounted in the holder.

5. The holder according to claim 4 wherein the foot portion is pivotally connected to the member and adapted to be selectively adjusted and held in various angular positions in relation to the member in a common plane therewith.

6. The holder according to claim 4 wherein the transverse opening in the holder is of a size to permit rotation of the member therein, the member has opposite flat parallel faces which are adapted to be held in either of two predetermined positions in relation to said opening and clamping means for engaging one of said flat faces to prevent rotation of the member and insure movement of the member in a plane as set forth.

7. The holder according to claim 6 wherein the member is screw-threaded and the threads are rendered discontinuous by the flat faces and in that the means associated with both the holder and the member for moving said member in a plane comprises a nut rotatably mounted on the holder and engaging the screw threads on the member for moving it transversely to the holder.

ROBERT C. BAYER.

REFERENCES CITED

The following references are of record in the file of this patent:

UNITED STATES PATENTS

| Number | Name | Date |
|---|---|---|
| D. 135,757 | Nelson | June 1, 1943 |
| 255,123 | Starrett | Mar. 21, 1882 |
| 454,516 | Brown | June 23, 1891 |
| 1,034,795 | Helwig | Aug. 6, 1912 |
| 1,274,331 | Rockwell | July 30, 1918 |
| 1,300,837 | Horstmann | Apr. 15, 1919 |
| 1,478,954 | Hardaker | Dec. 25, 1923 |
| 1,617,005 | Ames | Feb. 8, 1927 |
| 1,893,404 | Friend | Jan. 3, 1933 |

FOREIGN PATENTS

| Number | Country | Date |
|---|---|---|
| 111,182 | Great Britain | Nov. 22, 1917 |
| 651,226 | France | Oct. 8, 1928 |